July 13, 1926.
H. E. BREMER
VEHICLE FOR ROUGH GROUND
Original Filed July 8, 1920
1,592,654
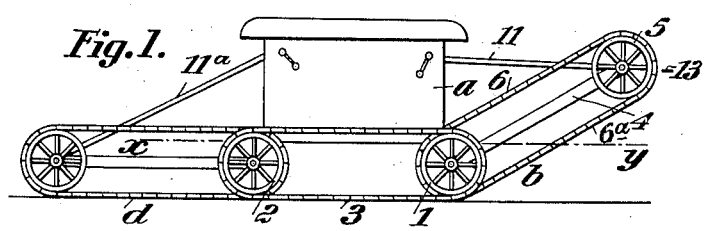
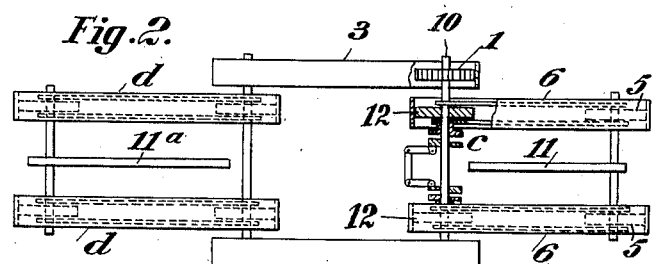
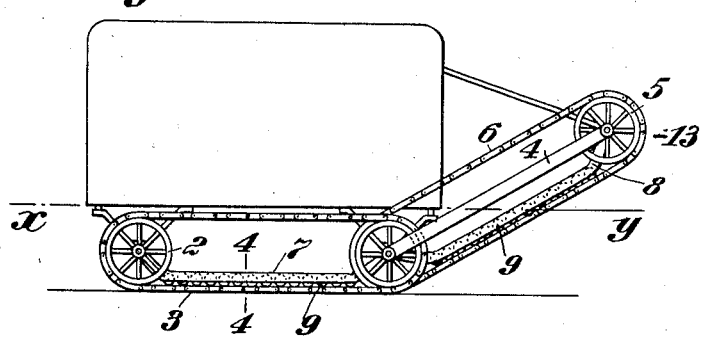
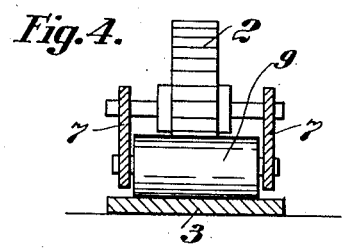
Witnesses:
Inventor:

Patented July 13, 1926.

1,592,654

UNITED STATES PATENT OFFICE.

HUGO E. BREMER, OF BERLIN, GERMANY.

VEHICLE FOR ROUGH GROUND.

Application filed July 8, 1920, Serial No. 394,838, and in Germany November 26, 1914. Renev June 1, 1926.

The invention relates to vehicles suitable for agricultural and military purposes and adapted for travelling over rough or soft ground, the vehicle being provided with endless track chains. The invention comprises features of construction hereinafter fully described, whereby the vehicle is enabled to lift and move itself over obstacles, such as tree trunks, walls, embankments, and other elevations which rise even as high as the bottom surface or platform of the vehicle body.

In the accompanying drawing,

Fig. 1 is a side elevation of a vehicle embodying my improvements;

Fig. 2 is a bottom plan view of the same;

Fig. 3 is a schematical side elevation of a vehicle like that shown in Figs. 1 and 2, but omitting the rear climbing attachment and having members extending between the wheels for supporting the ground-engaging portions of the chains against inward flexure where the wheels are only small and where therefore the wheels do not support the chains high enough;

Fig. 4 is a section on the line 4—4 of Fig. 3.

In the drawing, similar parts are indicated by similar reference characters in the several views. Referring to Figs. 1 and 2, $a$ indicates the body of a vehicle, supported at its ends upon pairs of wheels 1—1, and 2—2, and track chains 3, consisting of hingedly connected foot-plates, extend around the wheels in well known manner and form portable tracks. In order to enable the vehicle to overcome high obstacles, it is provided at its forward end with a climbing attachment $b$, comprising a frame 4, hinged to the forward axle 10 of the vehicle, and normally held in an upwardly inclined position by a rod or brace bar 11. Upon the forward end of this frame is mounted an axle carrying a pair of wheels 5, and track chains 6 extend around these wheels and around a pair of wheels 12 on the forward axle 10 of the vehicle. All these wheels are guiding the chains and at the same time protect them against inward flexure when they meet an obstacle. The idea of this invention is to guide and support the chains in front of the vehicle to such a height and extent that their back-turning point—that is the point where the parts of the chain begin to move to the rear—reaches remarkably above the platform of the vehicle in order to make it suitable for larger obstacles.

Following this principle for instance the chain supporting front wheel may be put forward and enlarged to such unusual extent as to support the chain or in order to overcome still higher obstacles a structure is chosen as designed in Figs. 1 and 2 where the support of the chain is done only partly by the wheels and partly by the supporting frame 4. The full effect is only possible by a chain which is thoroughly supported as otherwise not only the friction and strain on the links of the chain would be too considerable but also by the inward bend of this chain caused by the obstacle the lifting angle would be irregular instead of continuous. The elevation of the wheels 5 is such that the stretches $6^a$ of the chains 6 extend remarkably above the level of the bottom of the vehicle, indicated by the line $x$—$y$; thus, the points 13 on the forward sides of the wheels 5, where the lower stretches of the chains start on their return movement to the wheels 12, should be above the line $x$—$y$, in order that the chains may lift the body above the vehicle over obstacles even much higher than the bottom of the body. The chains 3 and 6 pass around wheels of the same diameter on the axle 10, and the lower stretches of the chains 6 form an inclined track which is, for all practical purposes, a continuation of the track formed by the lower stretches of the chains 3. Therefore the same effect is reached if the chain 3 runs without interruption over the front wheels direct above the line $x$—$y$. In this case the side view is practically the same as Fig. 3 but in the vehicle designed in Fig. 1 the chain 6 may be driven from the axle 10 through clutches indicated at $c$. It will be understood that the axle 10 and chains 3 are driven by a motor mounted in the vehicle, the motor and driving connections not being shown in the drawing as these are well known devices and form no part of the present invention. If desired, a climbing attachment $d$, in all respects the same as the attachment $b$, may be provided at the rear end of the vehicle, and all these attachments $d$ may be raised or lowered by means of an adjustable rod or brace $11^a$.

In Fig. 3, the vehicle is provided with the horizontal chains 3 and the upwardly inclined chains 6, the same as in the previously described figures. In addition, supporting frames 7 and 8 are provided for supporting or bracing the ground-engaging stretches of the chains against inward flexure in passing over obstacles. Thus, the frame 7 extends from the front to the rear axle of the vehicle and close to the lower stretches of the chains 3, and the supporting structure 8 extends from the front axle to the shaft on which the wheels 5 are mounted and close to the lower stretches of the chains 6. Preferably, anti-friction rollers 9 are arranged on the supporting frames 7 and 8, for the chains to bear against.

As in Figs. 1 and 2, the chains on the climbing attachment extend above the bottom of the vehicle, the height of which is indicated by the line $x-y$, the downward turning points of the chains on the wheels 5 being necessarily above said line for satisfactory operation. It is to be noted that the climbing chains 6 are braced or supported against inward flexure practically throughout the entire length of their lower stretches, by the frame 8 and the wheels 12 and 5, which is desirable for climbing over high and rough obstacles.

What I claim is:

1. A self-propelled vehicle comprising a body, wheels supporting the body, and independent endless track chains at opposite sides of the vehicle beneath said wheels and also extending upwardly in front of the body to such height that their downward turning points at the front of the vehicle are above the bottom of the vehicle.

2. A self-propelled vehicle comprising a body, wheels supporting the body, independent endless track chains at opposite sides of the vehicle beneath said wheels and extending upwardly in front of the body to such height that their backward turning points at the front of the vehicle are above the bottom of the vehicle, these chains being supported against inward flexure by the chain leading means and means for preventing inward flexure of the lower stretches of said chains.

3. A self-propelled vehicle comprising a body, front and rear pairs of wheels for supporting the body, endless track chains extending around said wheels, a frame inclined upwardly in front of the body, wheels at the ends of said frame, endless track chains extending around the wheels on the frame and engaging the ground at approximately the ground line of said forward wheels, and means for driving said latter chains.

4. A self-propelled vehicle comprising a body, front and rear pairs of wheels for supporting the body, endless track chains extending around said wheels, a frame inclined upwardly in front of the body, wheels at the ends of said frame, and endless track chains extending around the wheels at the ends of the frame, the lower stretches of said latter chains extending from approximately the ground line of said forward wheels to a point above the bottom of the vehicle body.

5. A self propelled vehicle comprising a body, front and rear pairs of wheels for supporting the body, endless track chains extending around said wheels, a frame inclined upwardly in front of the body, wheels at the ends of said frame, endless track chains extending around the wheels at the ends of frame, the lower stretches of said latter chains extending from approximately the ground line of said forward wheels to a point above the bottom of the vehicle body, and means for supporting said lower stretches against inward flexure.

In testimony whereof I hereunto affix my signature.

HUGO E. BREMER.